Patented Sept. 7, 1943

2,328,956

UNITED STATES PATENT OFFICE 2,328,956

DIAZINE DERIVATIVES

Gaetano F. D'Alelio and James W. Underwood, Pittsfield, Mass., assignors to General Electric Company, a corporation of New York No Drawing. Application August 18, 1942,
Serial No. 455,214

12 Claims. (Cl. 260—251)

This invention relates to the production of new chemical compounds and more particularly to diazine derivatives. The invention especially is concerned with the production of new and useful bis-diazinyl carbazides.

The diazine derivatives of this invention may be represented by the following general formula.

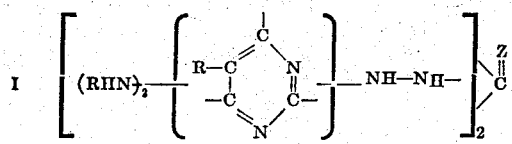

where R represents a member of the class consisting of hydrogen and monovalent hydrocarbon and substituted hydrocarbon radicals, more particularly halo-hydrocarbon radicals, and Z represents a member of the class consisting of oxygen and sulfur.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, cinnamyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoetyl, bromopropyl, fluorophenyl, iodophenyl, bromotolyl, etc. Preferably R in Formula I is hydrogen.

The new compounds of this invention may be used, for example, as pharmaceuticals, plasticizers and as intermediates in the preparation of derivatives thereof, e. g., hydrazino, ureido, amidine, methylol, methylene, etc., derivatives of the individual compound embraced by Formula I. These new compounds are especially valuable in the preparation of synthetic resinous compositions. Thus, they may be condensed with, for instance, aldehyde, including polymeric aldehydes, hydroxyaldehydes and aldehyde-addition products, to yield condensation products of particular utility in the plastics and coating arts. Such condensation products are more fully described and are specifically claimed in our copending application Serial No. 457,872, filed September 10, 1942, as a continuation-in-part of the present application and assigned to the same assignee as the present invention.

Various methods may be employed to produce the chemical compounds of this invention. One suitable method comprises effecting reaction, in the presence of a hydrohalide acceptor, between (1) a carbonyl or thiocarbonyl chloride or bromide and (2) a hydrazino diamino [(—NHR)₂] diazine in the ratio of one mol of the former to at least two mols of the latter. This reaction may be represented by the following general equation:

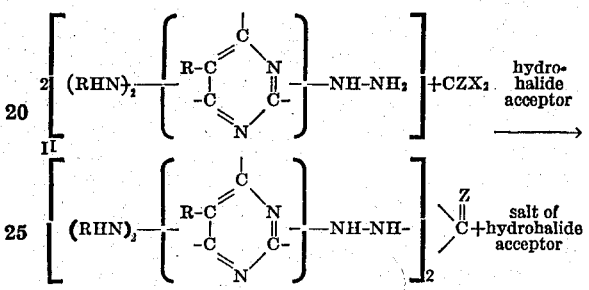

In the above equation X represents a halogen of the class consisting of chlorine and bromine, and R and Z have the same meanings as given above with reference to Formula I.

Illustrative examples of hydrazino-substituted diazines that may be employed, depending upon the particular end-product desired, are listed below:

2-hydrazino 4,6-diamino pyrimidine
4-hydrazino 2,6-diamino pyrimidine (6-hydrazino 2,4-diamino pyrimidine)
2-hydrazino 4,6-di-(methylamino) pyrimidine
2-hydrazino 4,6-di-(ethylamino) pyrimidine
2-hydrazino 4,6-di-(isobutylamino) pyrimidine
2-hydrazino 4,6-di-(propenylamino) pyrimidine
2-hydrazino 4,6-di-(cyclohexylamino) pyrimidine
2-hydrazino 4,6-dianilino pyrimidine
4-hydrazino 2,6-dianilino pyrimidine
2-hydrazino 4,6-ditoluido pyrimidine
4-hydrazino 2,6-ditoluido pyrimidine
2-hydrazino 4,6-dixylidino pyrimidine
4-hydrazino 2,6-dixylidino pyrimidine
2-hydrazino 4,6-di-(naphthylamino) pyrimidine
4-hydrazino 2,6-di-(naphthylamino) pyrimidine
2-hydrazino 4,6-di-(benzylamino) pyrimidine
4-hydrazino 2,6-di-(benzylamino) pyrimidine
2-hydrazino 4,6-di-(ethylanilino) pyrimidine
2-hydrazino 4,6-di-(chloroanilino) pyrimidine
4-hydrazino 2,6-di-(fluoroanilino) pyrimidine
2-hydrazino 4-methylamino 6-amino pyrimidine
2-hydrazino 4-anilino 6-amino pyrimidine 2-hydrazino 4-methylamino 6-anilino pyrimidine
2-hydrazino 4,6-diamino 5-methyl pyrimidine
4-hydrazino 2,6-diamino 5-methyl pyrimidine
2-hydrazino 4,6-di-(methylamino) 5-ethyl pyrimidine
2-hydrazino 4,6-di-(methylamino) 5-chlorophenyl pyrimidine
2-hydrazino 4,6-dianilino 5-isobutyl pyrimidine
2-hydrazino 4,6-dianilino 5-tolyl pyrimidine
4-hydrazino 2-chloroethylamino 5-methyl 6-iodoanilino pyrimidine
4-hydrazino 2,6-di-(bromotoluido) pyrimidine
2-hydrazino 4,6-di-(iodoanilino) pyrimidine
2-hydrazino 4,6-di-(chlorobutylamino) pyrimidine
2-hydrazino 4,6-di-(cyclohexenylamino) pyrimidine
2-hydrazino 4,6-di-(octylamino) 5-phenyl pyrimidine
4-hydrazino 2,6-di-(ethylamino) 5-cyclohexyl pyrimidine
2-hydrazino 4,6-di-(allylamino) 5-allyl pyrimidine
4-hydrazino 2,6-di-(methallylamino) 5-xenyl pyrimidine
2-hydrazino 4,6-di-(pentylamino) 5-butyl pyrimidine
4-hydrazino 2,6-di-(anthracylamino) 5-chloronaphthyl pyrimidine
2-hydrazino 4-methylamino 5-phenyl 6-ethylamino pyrimidine Various hydrohalide acceptors may be employed but we prefer to use a tertiary base, e. g., tertiary amines such as trialkyl (e. g., trimethyl, triethyl, tripropyl, tributyl, etc.) amines, triaryl (e. g., triphenyl, tritolyl, etc.) amines, pyridine, dimethyl aniline, etc. The reaction between the hydrazino-substituted diazine and the carbonyl or thiocarbonyl chloride or bromide may be carried out in any suitable manner, but preferably is effected in the presence of a suitable solvent or mixture of solvents. It is advisable to use an anhydrous medium as the solvent, e. g., ether, benzene, toluene, etc., because of the high degree of reactivity of the halide reactant. The reaction may be carried out under a variety of temperature and pressure conditions, for example at normal, sub-normal or at elevated temperatures and at atmospheric, sub-atmospheric or super-atmospheric pressures.

From the foregoing description it will be seen that the present invention provides a method of preparing, for example, a bis-(diamino pyrimidyl) carbazide, that is, a bis-(4,6-diamino pyrimidyl-2) carbazide or a bis-(2,6-diamino pyrimidyl-4) carbazide which comprises effecting reaction, in the presence of a hydrohalide acceptor, between carbonyl chloride (phosgene) and a hydrazino diamino pyrimidine (2-hydrazino 4,6-diamino pyrimidine or 4-hydrazino 2,6-diamino pyrimidine) in the ratio of one mol of the former to at least two mols of the latter. In a similar manner a bis-(diamino pyrimidyl) thiocarbazide is prepared by effecting reaction, in the presence of a hydrohalide acceptor, between thiocarbonyl chloride (thiophosgene) and a hydrazino diamino pyrimidine in the ratio of one mol of the former to at least two mols of the latter.

Another method of preparing the new chemical compounds of this invention comprises effecting reaction, under heat, preferably in aqueous solution, between (1) a hydrazino diamino [(—NHR)$_2$] diazine, numerous examples of which have been given above, and (2) urea or thiourea. This reaction may be represented by the following general equation:

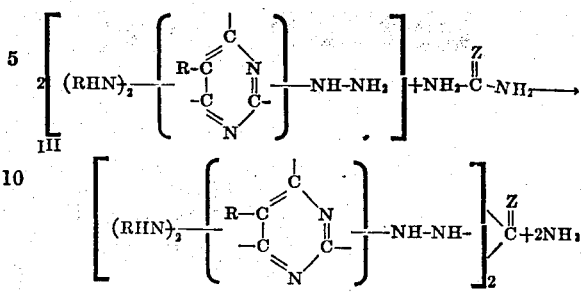

In this equation R and Z have the same meanings as given above with reference to Formula I. Instead of water, other solvents or mixtures of solvents may be employed, e. g., alcohol or a mixture of alcohol and water. The reaction may be effected at atmospheric, sub-atmospheric or super-atmospheric pressures, but preferably is effected at atmospheric pressure. In all cases it is necessary to carry out the reaction under conditions such as will result in the formation of ammonia as a by-product of the reaction. The following examples are illustrative of this method of preparing the new chemical compounds of this invention. All parts are by weight.

Example 1

This example illustrates the preparation of bis-[2,6-di-(methylamino) pyrimidyl-4] carbazide, which also may be named bis-[2,4-di-(methylamino) pyrimidyl-6] carbazide.

|  | Parts | Approximate mol ratio |
| --- | --- | --- |
| 4-hydrazino 2,6-di-(methylamino) pyrimidine | 150.0 | 2 |
| Urea | 26.8 | 1 |
| Water | 300.0 |  | were heated together under reflux at the boiling temperature of the mass for 16 hours, at the end of which period of time no more ammonia (a by-product of the reaction) could be detected. The reaction mass was cooled and the precipitated product comprising bis-[2,6-di-(methylamino) pyrimidyl-4] carbazide was filtered off, washed well with water and dried. A yield of 146 parts of the purified and dried material was obtained.

Example 2

Bis-[4,6-di-(methylamino) pyrimidyl-2] carbazide is prepared in essentially the same manner as described under Example 1 with the exception that 150 parts of 2-hydrazino 4,6-di-(methylamino) pyrimidine are used in place of 150 parts of 4-hydrazino 2,6-di-(methylamino) pyrimidine.

Example 3

Bis-[2,6-di-(methylamino) pyrimidyl-4] thiocarbazide is prepared in essentially the same manner as described under Example 1 with the exception that 34 parts of thiourea are used in place of 26.8 parts of urea.

Example 4

Bis-(2,6-diamino pyrimidyl-4) carbazide is prepared in essentially the same manner as described under Example 1 with the exception that 125 parts of 4-hydrazino 2,6-diamino pyrimidine are used instead of 150 parts of 4-hydrazino 2,6-di-(methylamino) pyrimidine.

Example 5

Bis-(4,6-diamino pyrimidyl-2) carbazide is prepared in essentially the same manner as described under Example 1 with the exception that 125 parts of 2-hydrazino 4,6-diamino pyrimidine are used in place of 150 parts of 4-hydrazino 2,6-di-(methylamino) pyrimidine.

Example 6

Bis-(2,6-diamino pyrimidyl-4) thiocarbazide is prepared in essentially the same manner as described under Example 1 with the exception that 125 parts of 4-hydrazino 2,6-diamino pyrimidine are used instead of 150 parts of 4-hydrazino 2,6-di-(methylamino) pyrimidine and 34 parts of thiourea are used in place of 26.8 parts of urea.

Example 7

Bis-(4,6-diamino pyrimidyl-2) thiocarbazide is prepared in essentially the same manner as described under Example 1 with the exception that 125 parts of 2-hydrazino 4,6-diamino pyrimidine are used instead of 150 parts of 4-hydrazino 2,6-di-(methylamino) pyrimidine and 34 parts of thiourea are used in place of 26.8 parts of urea.

Other examples of compounds embraced by Formula I that may be produced in accordance with the present invention are listed below:

Bis-(4,6-diamino 5-methyl pyrimidyl-2) carbazide
Bis-(2,6-diamino 5-ethyl pyrimidyl-4) carbazide
Bis-(4,6-diamino 5-propyl pyrimidyl-2) thiocarbazide
Bis-(2,6-diamino 5-phenyl pyrimidyl-4) thiocarbazide
Bis-[4,6-di-(isobutylamino) pyrimidyl-2] carbazide
Bis-[4,6-di-(propenylamino) pyrimidyl-2] carbazide
Bis-[4,6-di-(cyclopentylamino) 5-propyl pyrimidyl-2] carbazide
Bis-(4,6-diamilino pyrimidyl-2) carbazide
Bis-(4,6-dianilino 5-phenyl pyrimidyl-2) thiocarbazide
Bis-(4,6-ditoluido pyrimidyl-2) carbazide
Bis-(4,6-ditoluido 5-chloroethyl pyrimidyl-2) carbazide
Bis-(4-methylamino 6-amino pyrimidyl-2) carbazide
Bis-(4-anilino 6-amino pyrimidyl-2) carbazide
Bis-(4-methylamino 6-anilino pyrimidyl-2) carbazide
Bis-(4-methylamino 5-fluorophenyl-6-ethylamino pyrimidyl-2) carbazide
Bis-(2-methylamino 6-bromoanilino pyrimidyl-4) thiocarbazide
Bis-[2,6-di-(benzylamino) pyrimidyl-4] carbazide
Bis-[2,6-di-(phenethylamino) pyrimidyl-4] carbazide
Bis-[2,6-di-(ethylphenylamino) pyrimidyl-4] carbazide
Bis-[2,6-di-(naphthylamino) pyrimidyl-4] carbazide
Bis-[4,6-di-(iodoxylidino) pyrimidyl-2] carbazide
Bis-(4,6-diamino 5-bromoethyl pyrimidyl-2) carbazide
Bis-(4-methylamino 5-bromophenyl 6-anilino pyrimidyl-2) thiocarbazide
Bis-(2,6-dianilino pyrimidyl-4) carbazide
Bis-(4,6-dianilino pyrimidyl-2) thiocarbazide
Bis-(2,6-dianilino pyrimidyl-4) thiocarbazide
Bis-(2,6-ditoluido pyrimidyl-4) carbazide
Bis-[4,6-di-(chloroanilino) pyrimidyl-2] carbazide
Bis-[2,6-di-(bromoanilino) pyrimidyl-4] thiocarbazide
Bis-[4,6-di-(iodotoluido) pyrimidyl-2] carbazide
Bis-[2,6-di-(fluoroanilino) pyrimidyl-4] thiocarbazide
Bis-(4,6-dixylidino pyrimidyl-2) carbazide
Bis-(2,6-dixylidino pyrimidyl-4) thiocarbazide
Bis-[4,6-di-(cyclohexylamino) 5-phenyl pyrimidyl-2] carbazide
Bis-[2,6-di-(octylamino) 5-ethyl pyrimidyl-4] thiocarbazide
Bis-[4,6-di-(allylamino) 5-allyl pyrimidyl-2] carbazide
Bis-[2,6-di-(cyclohexenylamino) pyrimidyl-4] carbazide
Bis-[4,6-di-(methallylamino) 5-xenyl pyrimidyl-2] carbazide
Bis-(4,6-diamino 5-cyclohexyl pyrimidyl-2) thiocarbazide
Bis-(2,6-diamino 5-methyl pyrimidyl-4) carbazide In a manner similar to that described above with particular reference to the production of the bis-pyrimidyl (1,3-diazinyl) carbazides and thiocarbazides, corresponding derivatives of the 1,2- or ortho-diazines (pyridazines) and of the 1,4- or para-diazines (pyrazines) may be prepared.

What we claim as new and desire to secure by Letters Patent of the United States is:

1. Chemical compounds corresponding to the general formula

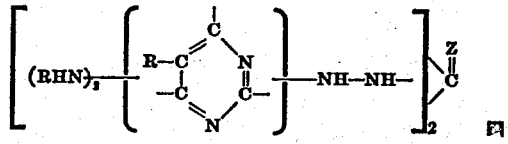

where R represents a member of the class consisting of hydrogen and monovalent hydrocarbon and halo-hydrocarbon radicals, and Z represents a member of the class consisting of oxygen and sulfur.

2. Chemical compounds as in claim 1 wherein R represents hydrogen.
3. Chemical compounds as in claim 1 wherein Z represents oxygen.
4. Chemical compounds as in claim 1 wherein Z represents sulfur.
5. A bis-(diamino pyrimidyl) carbazide.
6. Bis-(2,6-diamino pyrimidyl-4) carbazide.
7. A bis-(diamino pyrimidyl) thiocarbazide.
8. Bis-(2,6-diamino pyrimidyl-4) thiocarbazide.
9. A bis-[di-(methylamino pyrimidyl] carbazide.
10. Bis-[2,6-di-(methylamino) pyrimidyl-4] carbazide.
11. The method of preparing chemical compounds corresponding to the general formula

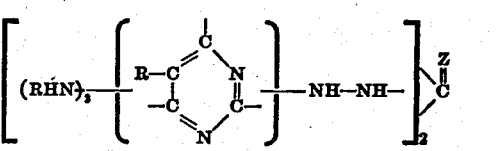

where R represents a member of the class consisting of hydrogen and monovalent hydrocarbon and halo-hydrocarbon radicals, and Z represents a member of the class consisting of oxygen and sulfur, said method comprising effecting reaction, in the presence of a hydrohalide acceptor, between (1) a halide represented by the general formula $$CZX_2$$

where Z represents a member of the class consisting of oxygen and sulfur and X represents a halogen of the class consisting of chlorine and bromine, and (2) a hydrazino-substituted diazine corresponding to the general formula

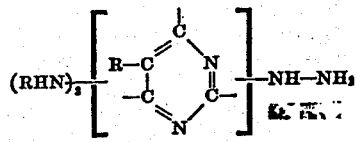

where R has the meaning above given, the said reactants being employed in the ratio of at least two mols of the hydrazino-substituted diazine of (2) per mol of the halide of (1).

12. The method of preparing a bis-(diamino pyrimidyl) carbazide which comprises effecting reaction, in the presence of a hydrohalide acceptor, between carbonyl chloride and a hydrazino diamino pyrimidine in the ratio of one mol of the former to at least two mols of the latter.

GAETANO F. D'ALELIO.
JAMES W. UNDERWOOD.

CERTIFICATE OF CORRECTION.

Patent No. 2,328,956. September 7, 1943.

GAETANO F. D'ALELIO, ET AL.

It is hereby certified that error appears in the printed specification of the above numbered patent requiring correction as follows: Page 1, first column, line 42, for "bromoetyl" read --bromoethyl--; line 54, for "aldehyde" read --aldehydes--; and second column, line 28, for "theabove" read --the above--; page 2, first column, line 61, for "damino" read --diamino--; page 3, first column, line 43, for "diamilino" read --dianilino--; line 54, after "fluorophenyl" strike out the hyphen; second column, line 57, after "methylamino" insert a closing parenthesis; and that the said Letters Patent should be read with this correction therein that the same may conform to the record of the case in the Patent Office.

Signed and sealed this 2nd day of November, A. D. 1943

(Seal)

Henry Van Arsdale,
Acting Commissioner of Patents.